United States Patent [19]

Thiel et al.

[11] Patent Number: 4,643,278
[45] Date of Patent: Feb. 17, 1987

[54] ACTUATING APPARATUS FOR A DISC BRAKE

[75] Inventors: Rudolf Thiel; Andreas Doell, both of Frankfurt am Main, Fed. Rep. of Germany

[73] Assignee: Alfred Teves GmbH, Frankfurt am Main, Fed. Rep. of Germany

[21] Appl. No.: 695,010

[22] Filed: Jan. 25, 1985

[30] Foreign Application Priority Data

Feb. 8, 1984 [DE] Fed. Rep. of Germany ....... 3404352

[51] Int. Cl.$^4$ ............................................. F16D 65/16
[52] U.S. Cl. .................. 188/72.7; 188/72.9; 188/71.9; 188/72.6; 188/106 F
[58] Field of Search .............. 188/72.9, 72.7, 72.8, 188/72.6, 71.9, 71.8, 71.7, 79.5 K, 79.5 P, 79.5 GC, 79.5 GT, 106 F; 267/58, 59, 155, 156, 157

[56] References Cited

U.S. PATENT DOCUMENTS

| 2,533,927 | 12/1950 | Geyer | 188/79.5 GT |
|---|---|---|---|
| 3,126,072 | 3/1964 | Johansson | 267/155 |
| 3,155,195 | 2/1963 | Brawerman | 188/72.8 |
| 3,372,775 | 3/1968 | Beller et al. | 188/72.6 |
| 3,556,263 | 1/1971 | Wieger | 188/79.5 |
| 3,765,511 | 10/1973 | Toyomasu | 188/72.7 |
| 3,783,981 | 1/1974 | Burgdorf | 188/71.9 |
| 4,063,621 | 12/1977 | Heibel | 188/72.6 |

FOREIGN PATENT DOCUMENTS

| 0977296 | 11/1975 | Canada | 188/71.9 |
|---|---|---|---|
| 1966394 | 8/1972 | Fed. Rep. of Germany . | |
| 2325296 | 12/1973 | Fed. Rep. of Germany . | |
| 2933653 | 4/1981 | Fed. Rep. of Germany . | |
| 2448182 | 8/1982 | Fed. Rep. of Germany . | |
| 0021033 | 2/1983 | Japan | 188/71.8 |

Primary Examiner—Douglas C. Butler
Assistant Examiner—Alvin Oberley
Attorney, Agent, or Firm—James B. Raden; Donald J. Breh

[57] ABSTRACT

An actuating apparatus is provided for use in a disc brake. The disc brake includes a brake piston slidably accommodated in a brake cylinder. A mechanically actuatable brake lever is non-rotatably coupled to an actuating shaft. The actuating shaft is rotatably accommodated in a bore in a brake cylinder housing. A thrust member is positioned between the actuating shaft and the piston or a further actuating element. A spring preloads the brake lever in the direction of rotation toward a final position. To create an actuating apparatus easy to set-up and mount, the spring also urges the actuating shaft in an axial direction against a stop or a support.

1 Claim, 4 Drawing Figures

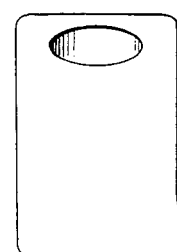
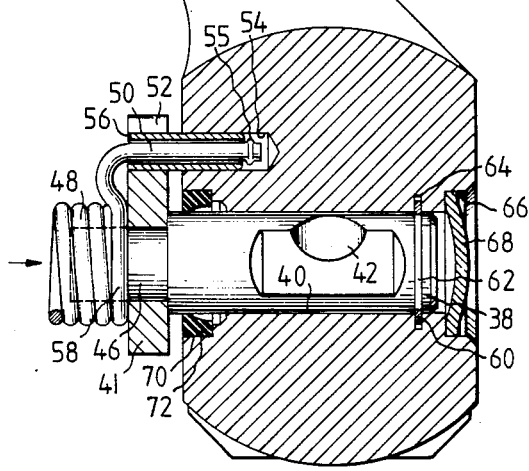
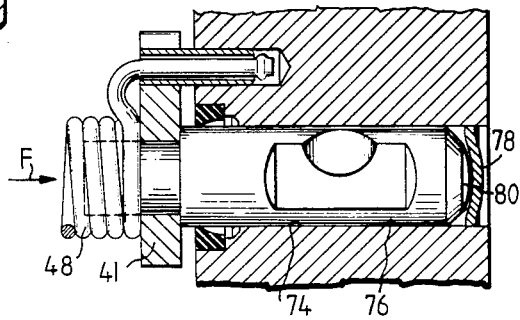
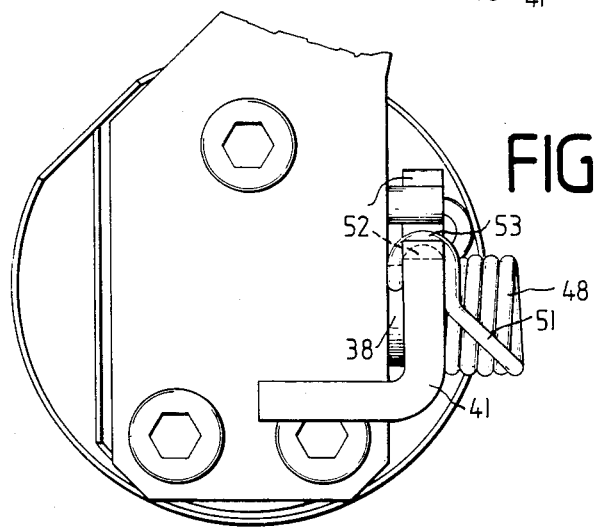

ACTUATING APPARATUS FOR A DISC BRAKE

BACKGROUND OF THE INVENTION

The present invention is related to an actuating apparatus for a disc brake.

One known actuating apparatus is shown in the German published patent application No. 2,448,182 C2. In that actuating apparatus, the axis of the actuating shaft is positioned parallel to the axis of the piston. The actuating shaft is provided with a crank jogged radially relative to the axis of the actuating shaft, in which crank there is a recess to support one end of a thrust member. In the hollow piston of that actuating apparatus, there is arranged a pressure device which is comprised of an external sleeve, an internal pin coupled to the piston and a locking mechanism between the pin and piston and the sleeve. The connection of the sleeve to the pin by means of the locking mechanism allows an automatic adjustment of the overall length of said pressure device. In its center, the end of the sleeve facing the front wall of the cylinder is furnished with a recess which accommodates the other end of the thrust member. Outside the cylinder, the actuating shaft has a polygonal cross-section at which an operating lever is received. Said lever is retained in its position in axial direction by a nut and a lock washer and is urged by a torsion spring into a first swivelling position in which the lateral jogging between the recesses receiving the thrust member is at its maximum. By a swivelling motion of the lever against the force of the torsion spring, the lateral jogging between the recesses is reduced and thereby the inclination of the thrust member diminished, as a result whereof the pressure device is urged away from the cylinder front wall in order to adjust the piston mechanically. Such an actuating apparatus is very expensive to manufacture and mount in a vehicle. In particular, an exact adjustment of the actuating shaft in an axial direction is very difficult, if not altogether impossible, since the operating lever is abutted against a flexibly yielding seal which is located in the cylinder front wall. This may lead to inconvenience in operation because the axial position of the thrust member fails to be exactly defined.

Accordingly, it is seen that actuating apparatuses are already in use in which the actuating shaft extends vertically to the direction of motion of the piston and is supported excentrically in order to impart to the thrust member an axially directed motional component. Nevertheless, the axial position of the actuating shaft and, consequently, of the thrust member taking support on it fails to be distinctly defined in these arrangements.

The present invention has, therefore, an object to provide an actuating apparatus which is easy to set-up and mount, and in which no inconveniences arise from not being able to exactly define the axial position of the thrust member.

SUMMARY OF THE INVENTION

In accordance with the present invention, a brake actuating apparatus is provided in which the actuating shaft and, consequently, the thrust member is urged at all times into an exactly defined position under the action of the spring.

According to an advantageous embodiment of the present invention, a stop formed by a disc or a ring is inserted in the bore of the housing. In this configuration, the disc or ring is, indeed, inserted in a portion of the bore of the housing which has a diameter equal to the diameter of that portion into which the substantial part of the actuating shaft extends.

A helical spring is employed whose axis of winding substantially coincides with the axis of rotation of the actuating shaft. The helical spring abuts with one of its windings against a hand brake lever and/or against a frontal side of the actuating shaft. According to further embodiments of the present invention, one stem of the helical spring may extend into an opening of the housing and run substantially parallel to the axis of rotation of the actuating shaft. A sleeve surrounding the stem is provided for easy and quick fastening of that stem within the opening.

One portion of the spring may extend through a recess provided in the operating lever. This portion runs substantially parallel to the axis of rotation of the actuating shaft and is surrounded by the sleeve. The other stem of the helical spring may be provided with an end which is bent over into a U-shape and is suspended at the operating lever.

For ease of manufacture, the housing bore which accommodates the actuating shaft has a substantially equal diameter throughout. However, and extension may be provided at the end of the bore in which a lip seal is positioned whose sealing lip is abutted against the actuating shaft.

In particular, the present invention provides an actuating apparatus for a disc brake, said disc brake comprising a brake piston for actuating a brake shoe, a brake cylinder in which said piston is slidably mounted, a mechanically actuatable brake lever, an actuating shaft to which said brake lever is non-rotatably coupled, a brake cylinder housing having a bore in which said actuating shaft is rotatably mounted, a thrust member positioned between the said actuating shaft and the piston, and a spring preloading the said brake lever in the direction of rotation, wherein said spring also urges said actuating shaft in an axial direction against a stop.

BRIEF DESCRIPTION OF THE DRAWINGS

FIG. 2 is a cross-section through the actuating apparatus along line A—A in FIG. 1;

FIG. 3 is a partial side view in the direction X in FIG. 1; and

FIG. 4 is a partial cross-section through another embodiment of the brake actuating apparatus of the present invention.

DESCRIPTION OF THE PREFERRED EMBODIMENT

Figure 1:
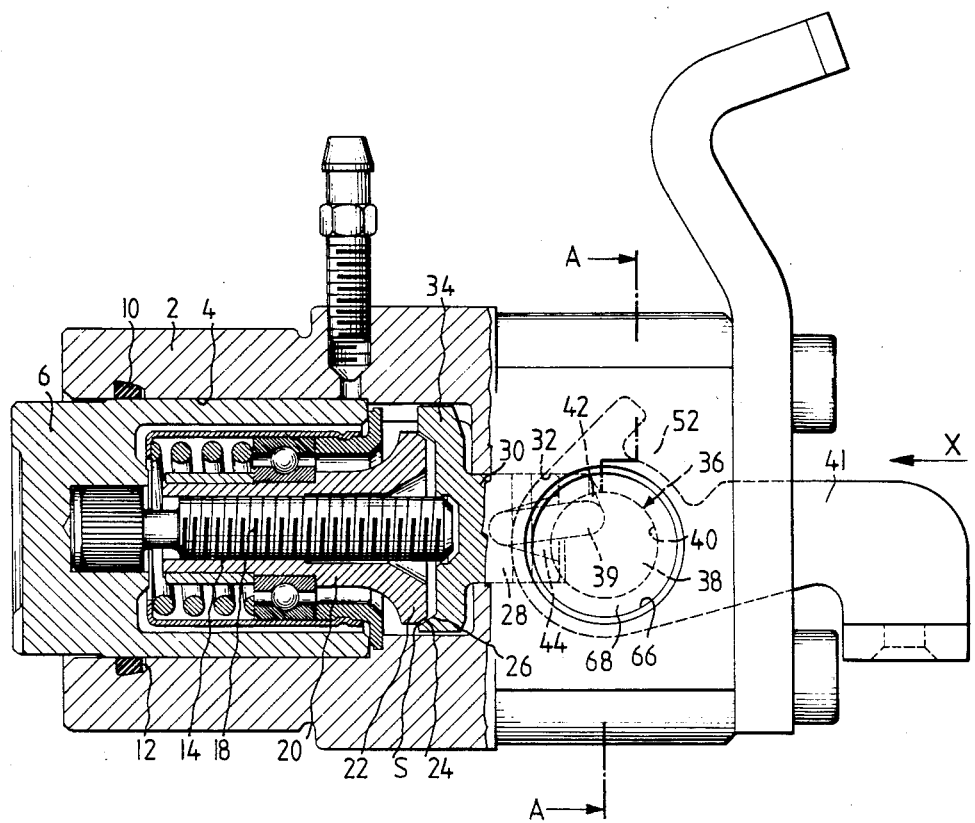
FIG. 1 is a longitudinal section through a part of a disc brake actuating apparatus.

Referring now to FIG. 1, there is shown a longitudinal section through a part of a disc brake and actuating apparatus, with one side of the brake being shown without lining and without the disc being illustrated. In a brake housing 2 (only partly shown) there is provided a cylinder bore 4 in which a brake piston 6 is axially slidably arranged. Brake piston 6 has a cup-shaped configuration, with its open end being accommodated within cylinder bore 4; whereas the closed end of piston 6 projects from cylinder bore 4 in order to press against a brake shoe (not shown). For the purpose of sealing off brake piston 6 relative to cylinder bore 4, a roll-back seal 10 is positioned in an annular groove 12 of the brake housing 2. Roll-back seal 10 also serves to restore the brake piston 6 after brake actuation has ceased.

At the bottom of brake piston 6, an adjusting spindle 14 is arranged in a non-rotatable manner. Spindle 14 extends in a coaxial direction through the cavity formed by brake piston 6 and is furnished with a steep thread 18 to prohibit reversible movement of spindle 14. A complementary thread is presented by an adjusting nut 20 which is threaded on adjusting spindle 14. Adjusting nut 20 has a substantially cylindrical shape, but is furnished, at its end facing away from the piston 6, with a radial projection 22 which forms a conical friction area 24. A further conical friction area 26 coacts with friction area 24 and is provided on a mechanically actuatable parking brake piston 28. Parking brake piston 28 is formed with a cylindrical portion 30 which is slidably accommodated in a portion 32 of bore 6 having a reduced diameter. Piston 28 includes a dish-shaped portion 34 which extends substantially radially from the body of piston 28 which friction area 26 is provided. Dish-shaped portion 34 of parking brake piston 28 embraces radial projection 22 of the adjusting nut 20 from the outside, with the parking brake clearance 5 remaining between the friction areas 24, 26.

In this context, the parking brake piston 28 is furnished with an anti-twist guard shown as a radial projection which engages in an axially directed recess in the housing 2.

Apart from parking brake piston 28, the mechanical actuating apparatus comprises an eccentric device 36 which acts upon parking brake piston 28 through a thrust member 39. Eccentric device 36 is provided with an actuating shaft 38 which is rotatably accommodated in a bore 40 extending at right angles to the cylinder bore 4 and to which a parking brake lever 41 is coupled. In actuating shaft 38, there is provided a recess 42 in which one end of thrust member 39 is positioned in a recess 44 formed in parking brake piston 28.

Referring to FIG. 2, actuating shaft 38 extends through a substantial part of bore 40. The left end of actuating shaft 38 projects out of bore 40 and is formed with a portion 46 having a reduced diameter to which parking brake lever 41 is fastened. Expediently, parking brake lever 41 is fastened to actuating shaft 38 by welding. Other fastening means may, however, be provided as an alternative. Around portion 46 a helical spring 48 is arranged which is formed with a first stem 50 that is bent over into a paraxial direction and passes through a recess 52 in parking brake lever 41 and engages in a bore 54 in brake housing 2. First stem 50 bears a sleeve 56 which is partly received in bore 54 and which serves to fasten stem 50. The other part of sleeve 56 extending out of bore 54 through recess 52 of parking brake lever 41 serves as a stop for parking brake lever 41. The configuration and fastening of spring 48 are such that an axial force F is exerted on the actuating shaft 28. Axial force F is transmitted to parking brake lever 41 by abutment against lever 41 by a spring winding 58 and from the parking brake lever 41 to actuating shaft 38. For fixation of stem 50 within sleeve 56, a radial projection 55 which may, for example, be obtained by upsetting is provided at the end of stem 50. In the embodiment shown in FIG. 2, a radially resilient ring 60 is provided on the other side of the actuating shaft 38. Ring 60 engages a groove 62 in actuating shaft 38 and an an analogous groove 64 in the inner wall of bore 40, so serving as a support for actuating shaft 38. On this side, bore 40 ends up in a disc 68 which is pressed into a radially extended portion 66 of bore 40. Also on its opposite side, a radially extended bore portion 70 is provided which receives a lip seal 72 whose sealing lip abuts actuating shaft 38.

Referring to FIG. 3, helical spring 48 is formed with a further stem 51 which runs obliquely across the outside of the pack of spring windings and is furnished with a U-shaped end 53 with which it is suspended in a recess 52 at parking brake lever 41.

In the second embodiment illustrated in FIG. 4 and which is largely identical to the embodiment of FIGS. 1 to 3, a bore 74 is formed with a practically equal diameter throughout its length to accommodate the actuating shaft 76. A disc 78 serving as a support for actuating shaft 76 is pressed into bore 74. Actuating shaft 76 is directly abutted against disc 78 with its curved end 80 and is maintained in abutment with disc 78 by helical spring 48. As a result, the position of the actuating shaft 76 in an axial direction is exactly defined at all times.

What is claimed is:

1. An actuating apparatus for a disc brake comprising:
a brake cylinder housing including a brake cylinder, a first bore intersecting with said brake cylinder at a right angle therewith and a second blind bore disposed in parallel relation with said first bore;
a brake piston slidably mounted in said brake cylinder;
an actuating shaft rotatably journaled in said first bore having a first end protruding from said housing and having a second end in said first bore;
a thrust member slidably mounted in said brake cylinder between said piston and said actuating shaft;
first stop means associated with said first bore and said second end of said actuating shaft for axially positioning said actuating shaft in said first bore at a constant axial position relative to said thrust member;
an actuating lever non-rotatably affixed to said first end of said actuating shaft;
a tubular sleeve having a first portion extending a predetermined partial distance into and being affixed within said second bore and having a second portion extending externally from said second bore defining second stop means engaged by said actuating lever in a released position of said lever for positioning said actuating shaft at a constant angular position relative to said thrust member in said released position;
a closed coil helical torsion-spring around said actuating shaft having on end coil abutted against said actuating lever, said spring attached to said housing and to said actuating lever by way of a first stem portion of said coil abutted against said lever extending through said sleeve and having an expanded portion in said second bore against an internal end of said sleeve within said second bore; and
a second stem portion of a second end coil opposite said first end coil engaged to said actuating lever, said internal end of said sleeve located in said second bore at said predetermined distance, defining a non-resilient axial force on said actuating shaft positioning said second end thereof against said first stop means, whereby said actuating shaft is non-resiliently maintained at said constant axial position;
said torsion spring resiliently axially biasing said actuating lever against said second stop means, whereby said actuating shaft is maintained at said constant angular position.

* * * * *